United States Patent
Hiley et al.

(10) Patent No.: US 8,162,299 B2
(45) Date of Patent: Apr. 24, 2012

(54) VIBRATOR ISOLATOR SYSTEM

(75) Inventors: David Hiley, Los Angeles, CA (US);
Reynaldo Cabrera, Torance, CA (US);
Jason Brennan, Irvine, CA (US)

(73) Assignee: DRS RSTA Inc., Dallas, TX (US)

( * ) Notice: Subject to any disclaimer, the term of this patent is extended or adjusted under 35 U.S.C. 154(b) by 0 days.

(21) Appl. No.: 13/116,336

(22) Filed: May 26, 2011

(65) Prior Publication Data

US 2011/0226929 A1    Sep. 22, 2011

Related U.S. Application Data

(63) Continuation of application No. 12/400,557, filed on Mar. 9, 2009, now Pat. No. 7,950,633.

(60) Provisional application No. 61/086,880, filed on Aug. 7, 2008.

(51) Int. Cl.
*F16M 1/36* (2006.01)

(52) U.S. Cl. .................. 267/136; 188/380; 248/550

(58) Field of Classification Search .................. 267/136, 267/140, 379, 380; 248/550, 626
See application file for complete search history.

(56) References Cited

U.S. PATENT DOCUMENTS

| | | | |
|---|---|---|---|
| 3,625,466 A * | 12/1971 | Marshall et al. | 248/626 |
| 4,586,689 A | 5/1986 | Lantero | |
| 4,783,038 A | 11/1988 | Gilbert | |
| 4,848,525 A | 7/1989 | Jacot | |
| 5,305,981 A * | 4/1994 | Cunningham et al. | 248/550 |
| 5,351,930 A | 10/1994 | Gwinn | |
| 5,368,271 A | 11/1994 | Kiunke | |
| 5,890,569 A | 4/1999 | Goepfert | |
| 5,947,240 A | 9/1999 | Davis et al. | |
| 6,022,005 A * | 2/2000 | Gran et al. | 267/136 |
| 6,029,959 A * | 2/2000 | Gran et al. | 267/136 |
| 6,737,664 B2 | 5/2004 | Shaffer | |
| 6,871,561 B2 | 3/2005 | Denice, Jr. | |
| 7,097,140 B2 | 8/2006 | Staley | |
| 7,187,106 B2 | 3/2007 | Fuse et al. | |
| 7,320,389 B1 | 1/2008 | Myers et al. | |
| 7,950,633 B2 * | 5/2011 | Hiley et al. | 267/136 |
| 2008/0237949 A1* | 10/2008 | Hasegawa | 267/140 |

* cited by examiner

*Primary Examiner* — Christopher Schwartz

(74) *Attorney, Agent, or Firm* — Don J. Pelto; Sheppard, Mullin, Richter & Hampton LLP

(57) ABSTRACT

A vibration isolator system for attaching a payload to a supporting base is provided, the payload having a center of mass and the system consisting of at least three vibration isolating pods. Each pod has two associated, non-parallel, elastic struts. A first end of each strut is attached to the supporting base and a second end of each strut is attached to the payload at a respective mounting point, and the a projected elastic center of the system is substantially co-located with said center of mass. The vibration isolator system is operable to substantially prevent translational vibration of the supporting base from inducing angular rotation of the payload.

21 Claims, 6 Drawing Sheets

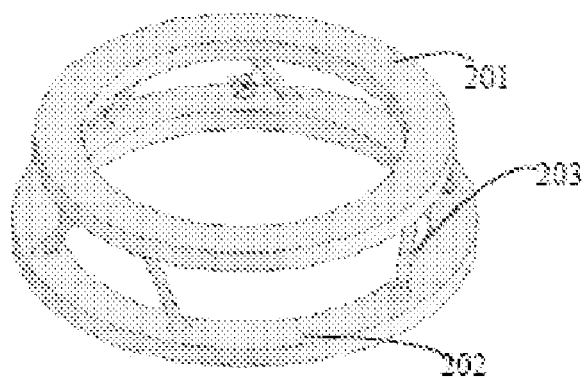
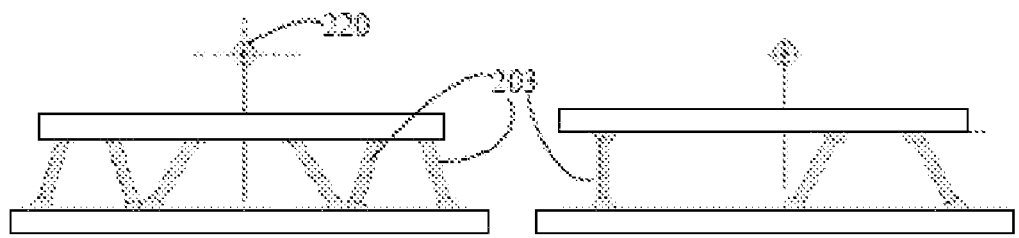
Figure 2
PRIOR ART
FIG. 2.

View AA

VIBRATOR ISOLATOR SYSTEM

CROSS REFERENCE TO RELATED APPLICATIONS

This application, which claims benefit under 35 U.S.C. §§120 and 119(e), is a continuation of U.S. application Ser. No. 12/400,557, filed Mar. 9, 2009, now U.S. Pat. No. 7,950,633 which claims the benefit of U.S. Provisional Application No. 61/086,880, filed Aug. 7, 2008, the content of which is hereby incorporated by reference into the present patent application in its entirety.

FIELD OF THE INVENTION

The present invention relates to vibration isolating techniques, particularly techniques for preventing translational vibration of a supporting structure from inducing angular rotation of a payload while minimizing geometric constraints on structures connecting the payload to the supporting structure.

BACKGROUND OF THE INVENTION

Vibration isolation is often used to stabilize a payload's angular orientation in the face of translational vibration. The translational vibration may be self induced by the payload (for example by self induced vibration from a motor of a gimbal assembly, or transmitted from a support structure upon which the payload is supported. Rotational motion of a payload may be reduced (or nearly eliminated) if the payload is supported by a suspension system that does not couple linear base motion vibration into angular motion. Such a suspension system may be referred to as a vibration isolator system.

Conventionally, such coupling may be prevented by providing elastic mounts (or struts) having attachment points to the payload in a common plane containing the payload's center of mass ("cm"). This places the "elastic center" of the isolators at the cm of the payload. The meaning of the term "elastic center", as used herein, may be better understood by considering a hypothetical suspension system including a plurality of elastic struts supporting an object, for example, a payload. The elastic center of the suspension system is the point at which, if the center of mass of the body is located at the point, the application of a force through the point would result in a pure translational movement, and the application of a moment about the point would result in pure rotation of the body about that point.

A problem exists for many system configurations where it is impossible to provide elastic struts having attachment points to the payload in a common plane containing the payload's cm. In optical systems, for example, the area of the cm plane may need to remain clear for the optical field of view for the optical system. For such systems, the elastic struts must be coupled to an attachment surface of the payload assembly or system that is substantially distant from the payload's cm.

Attachment points at which the elastic struts connect to the payload may collectively define a mount plane. As the term is used herein, a "projected elastic center" of elastic struts in a suspension system may be understood by recognizing that each elastic strut has a respective line of action (defined by its longitudinal axis) at an angle of orientation with respect to the mount plane. If the lines of action are each oriented at 90 degrees to the mount plane, so that the lines are parallel and do not intersect, the elastic center of the suspension system will be in the mount plane (i.e., the elastic center is not projected). Contrariwise, if the lines of action are not oriented at 90 degrees to the mount plane a projected elastic center will generally exist at some distance from the mount plane.

A special case where the projected elastic center coincides with a center of mass of the supported body, occurs when the line of action of each elastic mount (or "strut") passes through the center of mass of the supported body. As illustrated in FIG. 1, for example, a payload 110 is supported from a base structure 102 by elastic struts 103, each strut 103 having a line of action passing through the center of mass 120 of payload 110.

As disclosed in Denice, Jr., et al., U.S. Pat. No. 6,871,561 (hereinafter, "Denice"), when lines of action of elastic mounts (or isolators) intersect at the center of mass of a supported body, cross-coupling of translational vibration into rotational motion can be substantially eliminated.

Gran, et al., U.S. Pat. No. 6,022,005 (hereinafter, "Gran") discloses another arrangement for preventing the coupling of translational vibration unwanted rotational movements. According to Gran, three pairs of semi-active isolators are provided. The isolators in each pair are positioned in a parallel relationship with each other, lying in the same plane such that a centerline parallel to and midway between the two isolators of each pair passes through the center of mass of the payload.

The geometric relationships prescribed by the schemes disclosed in Gran and Denice are difficult or impossible to achieve in many real world situations. Referring now to FIG. 2, for example, where a payload attachment structure 201 is attached to a base attachment structure 202 by several elastic struts 203, available mounting places on the respective attachment structures do not permit the struts 203 to be arranged so that their line of action is directed toward center of mass 220 of the payload (not shown).

SUMMARY OF THE INVENTION

The present inventors have recognized that vibration of a support may be prevented from inducing angular rotation of a payload by satisfying geometric constraints substantially less restrictive than those disclosed in the prior art. For example, in accordance with various embodiments of the present invention, a projected elastic center may be caused to coincide with a supported object's center of mass even though the lines of action of isolators do not intersect at the supported object's center of mass. Neither is it required that parallel struts be disposed in pairs.

In accordance with systems and apparatuses consistent with the present invention, a vibration isolator system for attaching a payload to a supporting base is provided, the payload having a center of mass and the system consisting of at least three vibration isolating pods. Each pod has two associated, non-parallel, elastic struts. A first end of each strut is attached to the supporting base and a second end of each strut is attached to the payload at a respective mounting point, and the a projected elastic center of the system is substantially co-located with said center of mass. The vibration isolator system is operable to substantially prevent translational vibration of the supporting base from inducing angular rotation of the payload.

In an embodiment, each respective mounting point is located in a common mounting plane and the common mounting plane is substantially distant from the center of mass.

In a further embodiment, the center of mass is contained in a principal plane and each elastic strut has a respective longitudinal axis having a respective point of intersection with the principal plane where each respective point of intersection is equidistant from the center of mass. In some embodiments, each respective mounting point may be located in a common mounting plane parallel to the principal plane.

In yet a further embodiment, each vibration isolating pod consists of two associated co-planar, elastic struts, where each elastic strut has a respective longitudinal axis, and a respective virtual intersection point is associated with each pod, the respective virtual intersection point being a point of intersection between the respective longitudinal axes of the associated elastic struts within each pod; and the virtual intersection points are co-planar and equidistant from the center of mass.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 2 shows a payload support system according to the prior art.

DETAILED DESCRIPTION OF THE INVENTION

Reference will now be made in detail to an implementation in accordance with methods, systems, and products consistent with the present invention as illustrated in the accompanying drawings.

In an embodiment, a supported structure, for example a payload, is attached to a supporting base, for example a vehicle chassis, or other supporting structure, by at least three vibration isolating pods. Each pod may consist of two associated, non-parallel, elastic struts. Advantageously, the pods are arranged in such a manner that a projected elastic center is substantially co-located with said center of mass.

As the term is used herein, an elastic strut (or "strut") may be any type of elastic member having a line of action along a corresponding longitudinal axis. For example, a strut may consist of a simple spring element, or a spring element with a damper element, working together as a shock absorber. In order to provide for substantially linear motion along the longitudinal axis, linear guides or bushings may be included. Attachment points in the form of spherical bearings may be provided so that each strut carries predominantly axial loads along its longitudinal axis. Such bearings may minimize lateral loads perpendicular to the longitudinal axis or moment loads at the attachment points. Each strut may be passive, active, or semi-active.

Referring now to FIG. 3, an embodiment will be described and analyzed wherein a hexapod 300 apparatus, connects a payload attachment structure 301 to a base structure 302. The following analysis of a stiffness matrix for hexapod 300 will illustrate that off-diagonal terms of the stiffness matrix vanish if certain geometrical conditions are satisfied. In such case, a passive isolation system may be provided in which the spring stiffness characteristics in all six degrees of freedom are independent and decoupled from one another.

Figure 1:
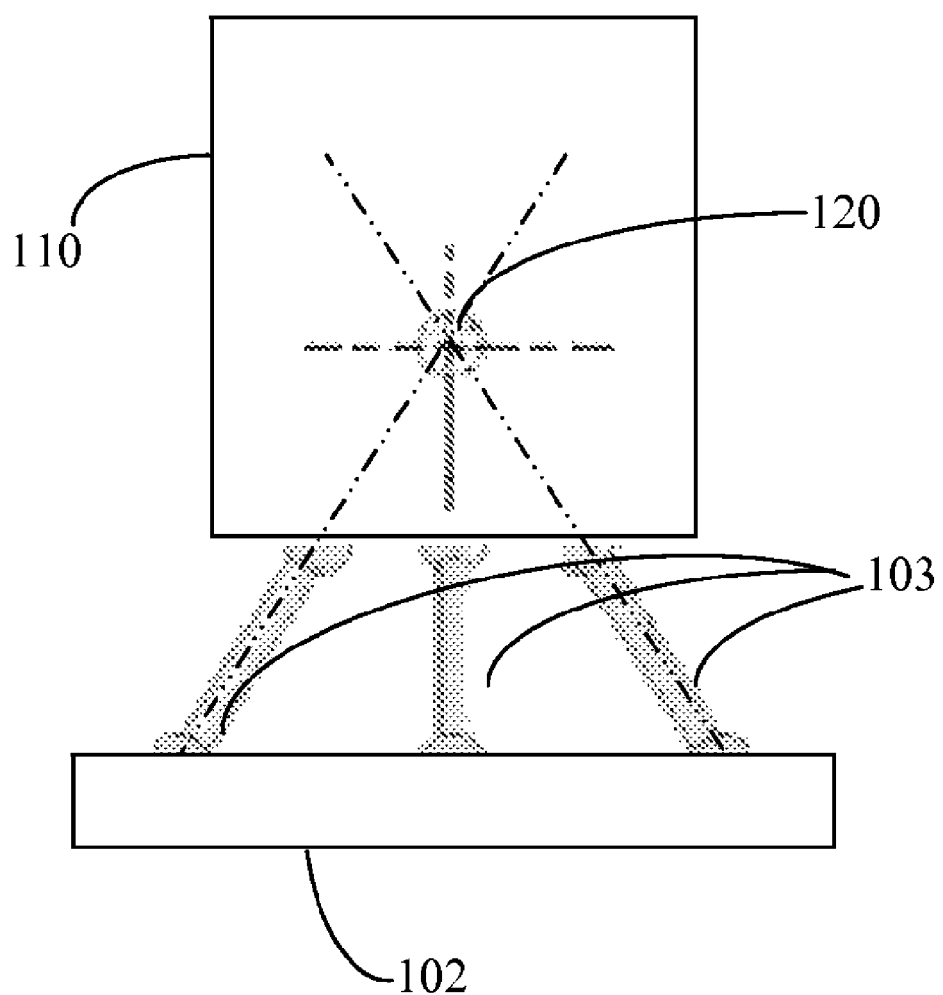
FIG. 1 shows a payload support system according to the prior art.
Figure 3A:
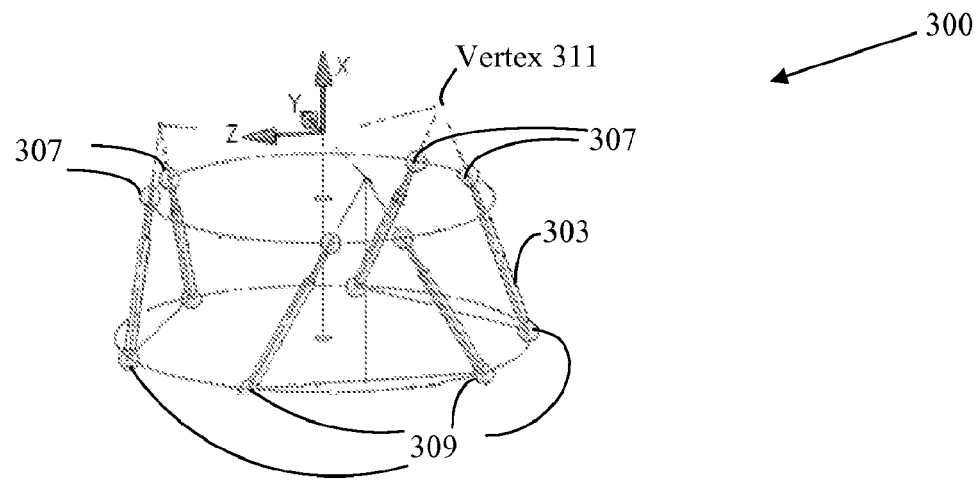
FIG. 3a depicts a perspective view of an illustrative embodiment of a vibration isolation system consistent with the present invention.
Figure 3B:
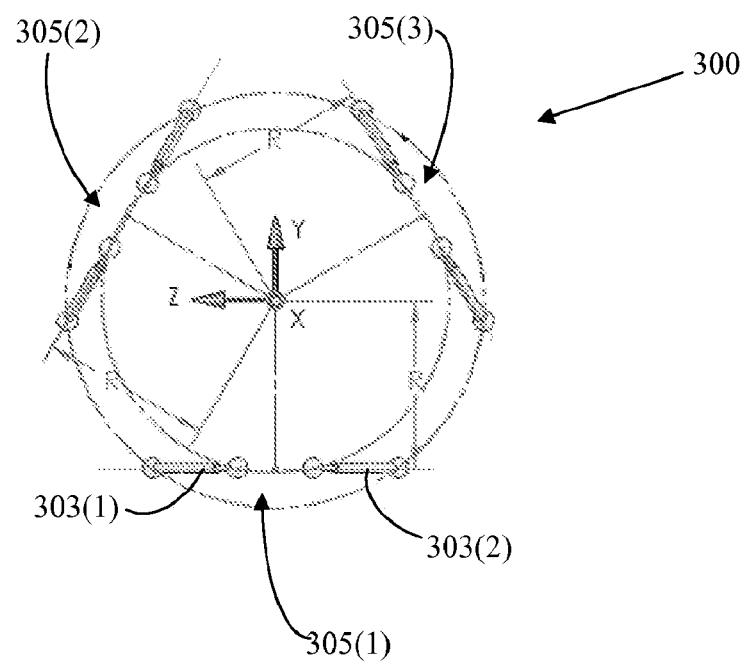
FIG. 3b depicts a plan view of an illustrative embodiment of a vibration isolation system consistent with the present invention.
Figure 3C:
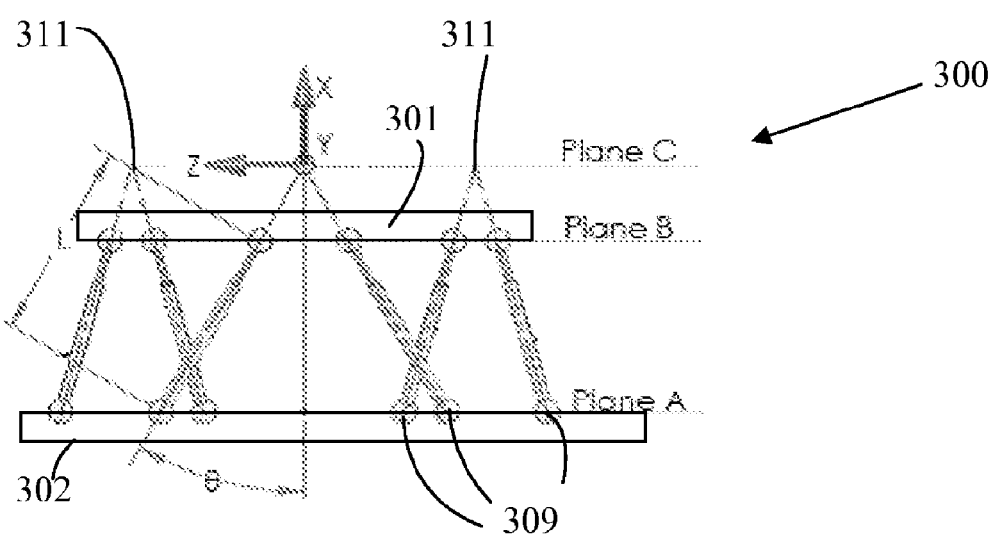
FIG. 3c depicts an elevation view of an illustrative embodiment of a vibration isolation system consistent with the present invention.

Hexapod 300 may be modeled as six idealized elastic struts 303, each having a first end attached to supporting base 302 and a second end attached to payload attachment structure 301 (FIG. 3c). Attachment points 307 and 309 represent interface between the elastic struts and, respectively the payload attachment structure 301 and supporting base 302 (FIG. 3a). Each strut may be characterized by its length and its axial stiffness, k (lb/in). Advantageously, ball joints at the ends of each strut 303 may provide that the struts act only in tension and compression. Moreover, each strut 303 may include some mechanism for damping.

As illustrated in FIG. 3b, hexapod 300 may consist of three bipods 305, each bipod consisting of two associated, non-parallel, struts 303. The three bipods 305 may be distributed symmetrically around an X-axis that is perpendicular to a plane defined, for example, by a plane containing respective mounting points 307. For convenience, the X-axis will be defined as vertical in the following discussion, but such definition is not limiting on the present invention.

In an embodiment, each of three bipods 305 consists of a pair of struts 303. Each bipod 305 may be configured such that both of struts 303 in a given bipod 305 reside in a common vertical plane parallel to axis X. As illustrated in FIG. 3b, each of the three bipods may be disposed equidistant from the X-axis at a radial distance R.

Referring now to FIG. 3c, one end of each of the struts 303 may be anchored to supporting base 302. Attachment points 309 may connect each strut 303 to supporting base 302 in a base plane, defined as plane A, orthogonal to the X-axis. A second end of each strut 303 may be attached to payload attachment structure 301 at a respective mounting point 307. The respective mounting points 307 may define a second plane, parallel to plane A, identified as plane B.

In an embodiment, struts 303 making up a respective bipod 305 are configured such that their longitudinal axes intersect at a virtual intersection point ("vertex") 311 located in the bipod plane. Advantageously, for each bipod 305, a respective vertex 311 lies in a common plane, plane C, parallel to plane A and plane B. A characteristic angle, $\theta$, is defined as the angle a strut 305 makes with a vertical line. Advantageously, angle $\theta$ may be identical for each strut in each bipod.

As demonstrated in the following analysis, the geometry of FIG. 3 will result in a projected elastic center being located on the X-axis at plane C, provided only that each bipod 305 is equidistant from axis X (e.g., at radius R) and has a common characteristic angle, $\theta$. For purposes of the following analysis, an arbitrary YZ plane of an XYZ coordinate system of a payload will be defined to coincide with plane C.

To determine and describe the stiffness characteristics of the hexapod illustrated in FIG. 3, the stiffness method (also called the displacement method) commonly used in finite element analysis, may be utilized. This method is documented, for example, in Rubenstein, Moshe F., *Matrix Computer Analysis of Structures*, N.J.: Prentice-Hall Inc., 1966.

Expressed in matrix form, the stiffness method models the relationship between forces and displacements according to equation (1):

$$\{F\} = [K]\{u\} \tag{1}$$

where,
- $\{F\}$ is a column matrix of system forces, acting on the hexapod;
- $\{u\}$ is a column matrix of system displacements; and
- $[K]$ is the system stiffness matrix.

For the present case, the elements of displacement matrix $\{u\}$ may be defined as:
- $u_1$ = x-axis translation (inches);
- $u_2$ = y-axis translation (inches);
- $u_3$ = z-axis translation (inches);
- $u_4$ = x-axis rotation (radians);
- $u_5$ = y-axis rotation (radians); and
- $u_6$ = z-axis rotation (radians).

The elements of force matrix $\{F\}$ may be defined as:
- $F_1$ = x-axis force (lbs);
- $F_2$ = y-axis force (lbs);
- $F_3$ = z-axis force (lbs);
- $F_4$ = x-axis moment (in-lb);
- $F_5$ = y-axis moment (in-lb); and
- $F_6$ = z-axis moment (in-lb).

System stiffness matrix $[K]$ may be generated from the stiffness characteristics of individual strut elements as illustrated by equation (2):

$$\{P\} = [\kappa]\{\delta\} \tag{2}$$

where,
- $\{P\}$ is a 6×1 column matrix of element forces
- $\{\delta\}$ is a corresponding 6×1 column matrix of element displacements, and
- $[\kappa]$ is a 6×6 element stiffness matrix.

For hexapod 300, each of the six struts may be characterized by a one dimensional relationship as illustrated by equation (3):

$$P_i = \kappa_i \delta_i \text{ for } i = 1\text{-}6 \tag{3}$$

Where $P_i$ and $\delta_i$ are the displacement and element force, respectively of strut 'i'.

Positive $P_i$ may defined as tension and positive $\delta_i$ may be defined as extension. For hexapod 300, when all six element stiffnesses are equal to k, $\kappa_{ij} = k$, for $i = j$; while $\kappa_{ij} = 0$ for $i \neq j$. The relationship between system displacements and element displacements is expressed in equation (4) in terms of compatibility matrix, $[\beta]$, where, $$\{\delta\} = [\beta]\{u\} \tag{4}$$

For hexapod 300, compatibility matrix $[\beta]$, according to small displacement theory, is:

| | | | | | |
|---|---|---|---|---|---|
| $\cos\theta$ | 0 | $-\sin\theta$ | $R\sin\theta$ | 0 | $R\cos\theta$ |
| $\cos\theta$ | 0 | $\sin\theta$ | $-R\sin\theta$ | 0 | $R\cos\theta$ |
| $\cos\theta$ | $\frac{1}{2}\sqrt{3}\sin\theta$ | $\frac{1}{2}\sin\theta$ | $R\sin\theta$ | $-\frac{1}{2}\sqrt{3}R\cos\theta$ | $-\frac{1}{2}R\cos\theta$ |
| $\cos\theta$ | $-\frac{1}{2}\sqrt{3}\sin\theta$ | $-\frac{1}{2}\sin\theta$ | $-R\sin\theta$ | $-\frac{1}{2}\sqrt{3}R\cos\theta$ | $-\frac{1}{2}R\cos\theta$ |
| $\cos\theta$ | $-\frac{1}{2}\sqrt{3}\sin\theta$ | $\frac{1}{2}\sin\theta$ | $R\sin\theta$ | $\frac{1}{2}\sqrt{3}R\cos\theta$ | $-\frac{1}{2}R\cos\theta$ |
| $\cos\theta$ | $\frac{1}{2}\sqrt{3}\sin\theta$ | $-\frac{1}{2}\sin\theta$ | $-R\sin\theta$ | $\frac{1}{2}\sqrt{3}R\cos\theta$ | $-\frac{1}{2}R\cos\theta$ |

The first column of compatibility matrix $[\beta]$ represents the six element displacements ($\delta_1$ to $\delta_6$) for a unit system displacement $u_1$ in the X-direction. Unit displacement $u_1$ in the X-direction produces a displacement of each strut equal to $u_1 \cos\theta$. Because of symmetry, all six struts experience the same displacement. The second column of compatibility matrix $[\beta]$ contains the strut displacements due to a unit system displacement, $u_2$ in Y-direction. Displacement $u_2$ causes no motion in struts 1 and 2 because they lie in a plane that is perpendicular to the motion. Struts 3 thru 6 have alternating extension and compression motion due to their orientation with respect to the Y-axis. The remaining elements in compatibility matrix $[\beta]$ are provided based on the same small displacement principles.

Further in accordance with the stiffness method, system stiffness matrix $[K]$ may be generated from compatibility matrix $[\beta]$ and element stiffness matrix $[\kappa]$ according to equation (5):

$$[K] = [\beta]^T [\kappa][\beta] \tag{5}$$

As noted above, the values of element stiffness matrix $[\kappa]$ are $\kappa_{ij} = k$ for $i = j$; and $\kappa_{ij} = 0$ for $i \neq j$. As a result, $[\kappa] = k[I]$, where k is a scalar value and $[I]$ is a unit identity matrix. As a result, equation (5) may be simplified to equation (6):

$$[K] = k[\beta]^T[\beta] \tag{6}$$

Stiffness matrix $[K]$, according to equation (6) is shown below:

| | | | | | |
|---|---|---|---|---|---|
| $6k\cos^2\theta$ | 0 | 0 | 0 | 0 | 0 |
| 0 | $3k\sin^2\theta$ | 0 | 0 | 0 | 0 |
| 0 | 0 | $3k\sin^2\theta$ | 0 | 0 | 0 |
| 0 | 0 | 0 | $6kR^2\sin^2\theta$ | 0 | 0 |
| 0 | 0 | 0 | 0 | $3kR^2\cos^2\theta$ | 0 |
| 0 | 0 | 0 | 0 | 0 | $3kR^2\cos^2\theta$ |

Since stiffness matrix $[K]$ has no off-diagonal terms, all 6 degrees of freedom are decoupled from each other and may be treated independently. Because this is the definition of the "elastic center" of a system, the foregoing shows that the elastic center is located at the origin of the selected coordinate system, i.e., at the intersection of the X-axis and Plane C, where plane C is defined by the three bipod vertices 311 and the X-axis is the axis of symmetry of hexapod 300. It will be evident that by adjusting angle θ, plane C can be moved to any desired distance from plane B.

Moreover, the foregoing teachings permit a hexapod support system to be designed that provides a projected elastic center coinciding with a supported object's center of mass. That is, the projected elastic center will coincide with a supported object's cm if one defines radius R with respect to a vertical axis passing through the supported object's cm, and judiciously selects angle θ, so that plane C is located at a distance from plane B corresponding to the vertical location of the supported object's cm.

Thus, increased flexibility to the structural design is provided, because, for example, the lines of action of the strut elements are not required to intersect at the supported object's center of mass and the strut elements are not required to be parallel.

The foregoing stiffness matrix [K] may be expressed in equation form relative to the XYZ coordinate system as shown in equation set (7)

$$K_X = 6k \cos^2\theta$$

$$K_Y = K_Z = 3k \sin^2\theta$$

$$K_{\phi x} = 6kR^2 \sin^2\theta = 2R^2 K_Y$$

$$K_{\phi y} = K_{\phi z} = 3kR^2 \cos^2\theta = \tfrac{1}{2}R^2 K_X \quad (7)$$

From equation set (7), it is evident that the three translational stiffnesses, $K_X$, $K_Y$, and $K_Z$ are a function of the angle θ and the strut axial stiffness 'k', but are independent of the location of planes A and B or the radius R. The angular stiffnesses, $K_{\phi x}$, $K_{\phi y}$, and $K_{\phi z}$ are a function of parameters k, θ, and R, but are likewise independent of the location of planes A and B.

The preceding analysis was for a hexapod configuration. However, the same results may be achieved using an octapod (8-strut) or higher numbered configuration. The generalized results for 'n' struts, each with stiffness 'k', where 'n' is an even number of six or more are provided as equation set (8):

$$K_X = nk \cos^2\theta$$

$$K_Y = K_Z = \tfrac{1}{2}nk \sin^2\theta$$

$$K_{\phi x} = 2R^2 K_Y$$

$$K_{\phi y} = K_{\phi z} = \tfrac{1}{2}R^2 K_X \quad (8)$$

Figure 4A:
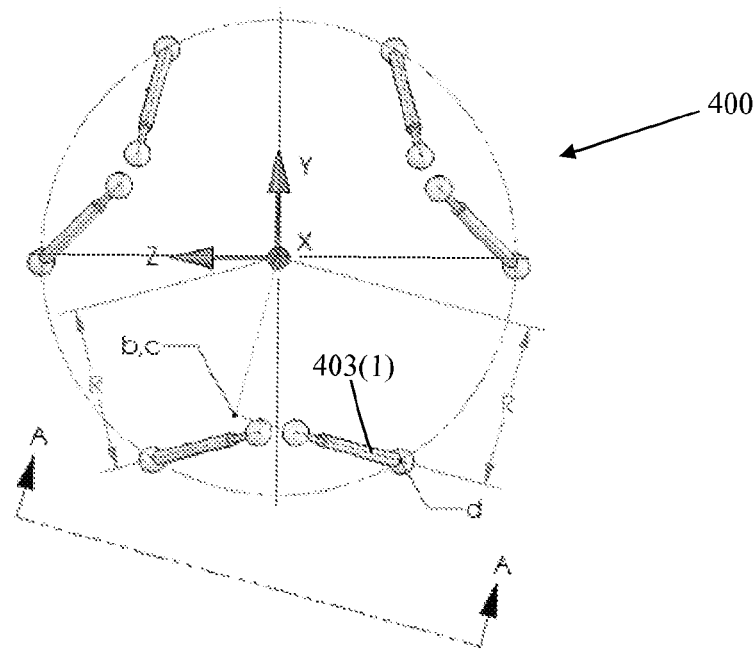
FIG. 4a depicts a plan view of another illustrative embodiment of a vibration isolation system consistent with the present invention.

Referring now to FIG. 4, the foregoing analysis may be further generalized to include configurations in which the bipod pairs have non-coplanar struts. FIG. 4a provides a view of a hexapod 400 apparatus observed along the X-axis, which, for purposes of the following analysis, remains defined as vertically oriented. The six struts 403 are arranged symmetrically around the X-axis, but no two of them are required to occupy a common vertical plane—they may each have their own vertical plane. The vertical plane of each strut 403 may be located a distance R from the X-axis.

Figure 4B:
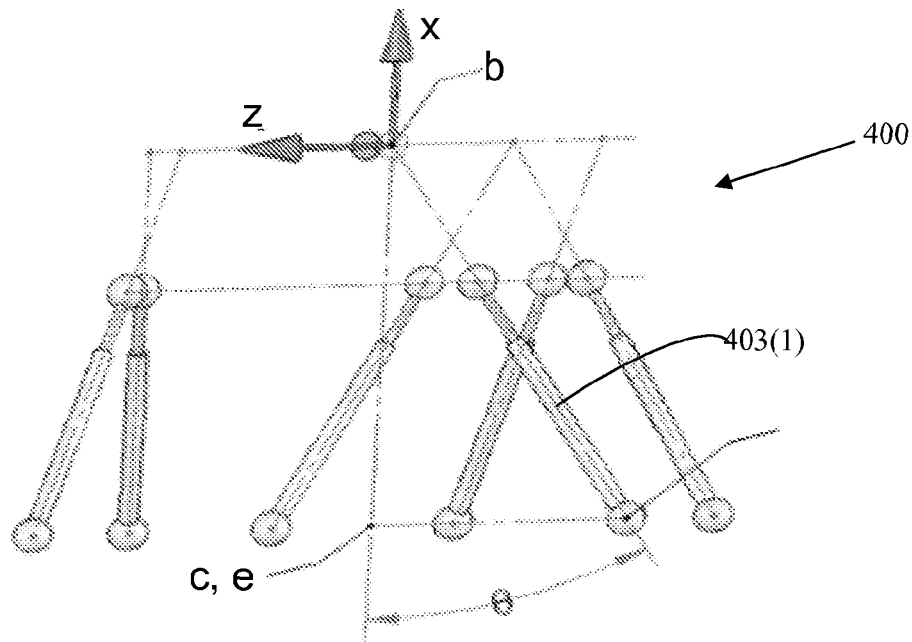
FIG. 4b depicts an elevation view of another illustrative embodiment of a vibration isolation system consistent with the present invention.
Figure 4C:
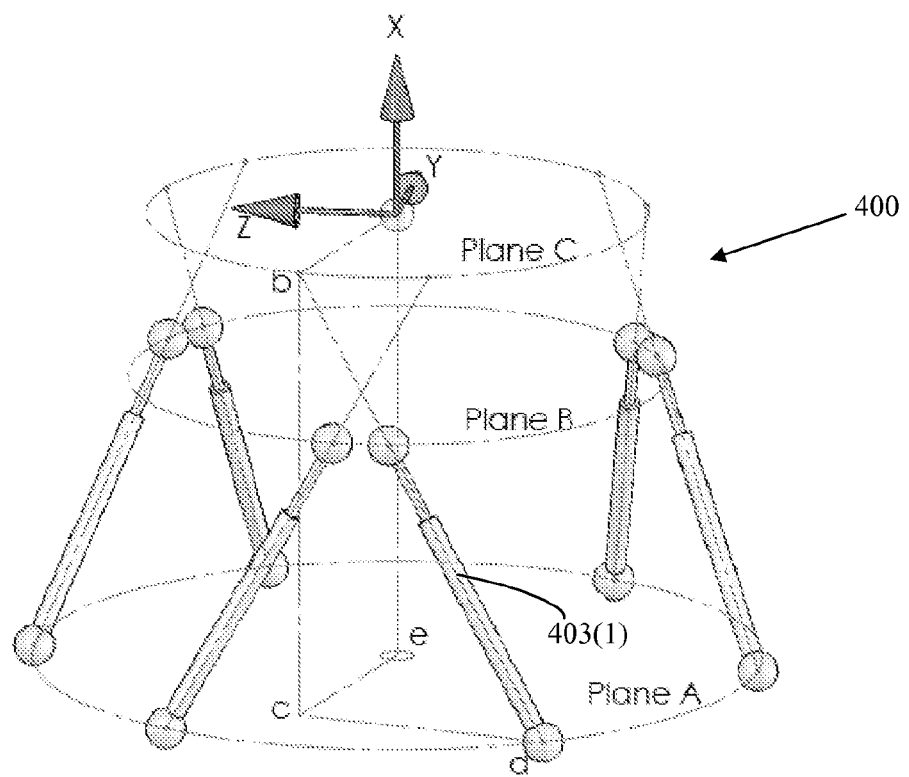
FIG. 4c depicts a perspective view of another illustrative embodiment of a vibration isolation system consistent with the present invention.

Within the vertical plane of a given strut 403, certain geometrical relationships may be observed. For example, strut 403(1) may be characterized by the triangle 'bcd', illustrated in FIGS. 4b and 4c. The point 'b' may be defined as the virtual intersection of the line of action of strut 403(1) with the plane that contains the X-axis and that is orthogonal to the vertical plane containing strut 403(1). FIG. 4b illustrates hexapod 400 viewed along a line normal to the plane containing strut 403(1). Strut angle θ is shown to be the angle from vertical of strut 403(1). As with each of the other five strut planes, the plane containing strut 403(1) is perpendicular to plane A and offset from the X-axis by a distance R. FIG. 4c illustrates hexapod 400 in isometric view, and shows that virtual intersection point 'b' may define a location of plane C, parallel to planes A and B, along the X-axis.

As illustrated in FIG. 4, all six struts may be disposed symmetrically around the X axis and have a common angle θ. In such configuration, the line of action of each strut will intersect plane C at a point equidistant from the X-axis. The present inventors have found that the elastic center of hexapod 400 is located in the center of Plane C. As in the preceding analysis performed for hexapod 300, the stiffness matrix will be decoupled and equation set (7) will apply.

It will be evident that, by judicious selection of angle θ, plane C can be formed at any desired distance from plane B. More specifically, the foregoing teachings permit a hexapod support system to be designed that provides a projected elastic center coinciding with a supported object's center of mass even though the lines of action of isolators do not intersect at the supported object's center of mass and even though no two struts are co-planar. Moreover, any distance R may be selected, thereby providing additional flexibility to a system designer.

The preceding analysis was for a hexapod configuration. However, the same results may be achieved with a larger number of struts. The generalized results for n struts, each with stiffness k, where n is an even number of 6 or more are provided as equation set (8).

From the foregoing teachings, it may be inferred that the critical geometrical relationships are the position of the vertical plane of the strut axes and the angular orientation of the strut axes. A projected elastic center coinciding with a supported object's center of mass may be provided without regard to strut length and without regard to the locations of Planes A and B. Thus, for example, the strut lengths do not need to be equal to each other and the attachment points need not be located on common planes A and B.

Thus, techniques for preventing translational vibration of a support from inducing angular rotation of a payload while minimizing geometric constraints on structures connecting the payload to the support have been disclosed. The foregoing description of an implementation of the invention has been presented for purposes of illustration and description. It is not exhaustive and does not limit the invention to the precise form disclosed. Modifications and variations are possible in light of the above teachings or may be acquired from practicing the invention.

Accordingly, while various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A system comprising:
    a supporting base;
    a payload attachment structure; and
    three pairs of elastic struts, each of the elastic struts comprising a first end and a second end, the first end of each of the elastic struts being coupled to the supporting base and the second end of each of the elastic struts being coupled to the payload attachment structure, the second ends of the elastic struts being in a common mounting plane, wherein each of the pair of elastic struts comprises two elastic struts that are non-parallel with each other, the three pairs of non-parallel elastic struts projecting an elastic center distant from the common mounting plane and the payload attachment structure.

2. The system of claim 1, wherein the common mounting plane is distant from a center of mass of a supported structure, the supported structure being coupled to the payload attachment structure.

3. The system of claim 2, wherein the center of mass is contained in a principal plane and each elastic strut has a respective longitudinal axis having a respective point of intersection with the principal plane.

4. The system of claim 3, wherein the common mounting plane is parallel to the principal plane.

5. The system of claim 1, wherein each elastic strut has a respective longitudinal axis and the respective longitudinal axes of each pair of elastic struts form a virtual intersection point, the virtual intersection point being a point of intersection between the respective longitudinal axes of the pair of elastic struts, the virtual intersection points being co-planar.

6. The system of claim 5, wherein the virtual intersection points are not co-located.

7. The system of claim 5, wherein the virtual intersection points are equidistant to a center of mass of a payload coupled to the payload attachment structure.

8. The system of claim 1, wherein the system is operable to substantially prevent translational vibration of the supporting base from inducing angular rotation of a supported structure coupled to the payload attachment structure.

9. The system of claim 1, wherein each pair of elastic struts reside in a different common vertical plane.

10. The system of claim 1, wherein two elastic struts of at least one of the pair of elastic struts do not reside in a common vertical plane.

11. A system comprising:
a supporting base;
a payload attachment structure; and
three pairs of compressible means for coupling the supporting base to the payload attachment structure for isolating vibration, each of the compressible means comprising a first end and a second end, the first end of each of the compressible means being coupled to the supporting base and the second end of each of compressible means being coupled to the payload attachment structure, the second ends of the compressible means being in a common mounting plane, wherein each of the pair of elastic struts comprises two elastic struts that are non-parallel with each other, the three pairs of non-parallel elastic means projecting an elastic center distant from the common mounting plane and the payload attachment structure.

12. The system of claim 11, wherein the common mounting plane is distant from a center of mass of a supported structure, the supported structure being coupled to the payload attachment structure.

13. The system of claim 12, wherein the center of mass is contained in a principal plane and each compressible means has a respective longitudinal axis having a respective point of intersection with the principal plane.

14. The system of claim 13, wherein the common mounting plane is parallel to the principal plane.

15. The system of claim 11, wherein each compressible means has a respective longitudinal axis and the respective longitudinal axes of each pair of compressible means form a virtual intersection point, the virtual intersection point being a point of intersection between the respective longitudinal axes of the pair of compressible means, the virtual intersection points being co-planar.

16. The system of claim 15, wherein the virtual intersection points are not co-located.

17. The system of claim 15, wherein the virtual intersection points are equidistant to a center of mass of a supported structure, the supported structure being coupled to the payload attachment structure.

18. The system of claim 11, wherein the system is operable to substantially prevent translational vibration of the supporting base from inducing angular rotation of a supported structure coupled to the payload attachment structure.

19. The system of claim 11, wherein each pair of compressible means reside in a different common vertical plane.

20. The system of claim 11, wherein two compressible means of at least one of the pair of compressible means do not reside in a common vertical plane.

21. A method comprising:
providing a supporting base;
providing a payload attachment structure; and
coupling the supporting base to the payload attachment structure using three pairs of elastic struts, each of the elastic struts comprising a first end and a second end, the first end of each of the elastic struts being coupled to the supporting base and the second end of each of the elastic struts being coupled to the payload attachment structure, the second ends of the elastic struts being in a common mounting plane, wherein each of the pair of elastic struts comprises two elastic struts that are non-parallel with each other, the three pairs of non-parallel elastic struts projecting an elastic center distant from the common mounting plane and the payload attachment structure.

* * * * *